(12) United States Patent
Tseng

(10) Patent No.: US 9,052,806 B2
(45) Date of Patent: Jun. 9, 2015

(54) USER INTERFACE FOR PRESENTING MEDIA ITEMS OF SOCIAL NETWORKING SERVICE IN MEDIA REEL

(75) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 446 days.

(21) Appl. No.: 12/973,695

(22) Filed: Dec. 20, 2010

(65) Prior Publication Data

US 2012/0159381 A1 Jun. 21, 2012

(51) Int. Cl.
| | | |
|---|---|---|
| G06F 3/048 | (2013.01) | |
| G06F 3/0485 | (2013.01) | |
| G06F 3/0482 | (2013.01) | |
| G06F 3/0488 | (2013.01) | |
| G06Q 50/00 | (2012.01) | |

(52) U.S. Cl.
CPC ............ *G06F 3/0485* (2013.01); *G06F 3/0482* (2013.01); *G06F 3/04886* (2013.01); *G06Q 50/01* (2013.01)

(58) Field of Classification Search
CPC . G06F 3/0485; G06F 3/0482; G06F 3/04886; G06F 3/017; G06Q 50/01
USPC .................................. 715/848, 830, 784–787
See application file for complete search history.

(56) References Cited

U.S. PATENT DOCUMENTS

| | | | | |
|---|---|---|---|---|
| 8,458,617 | B2 * | 6/2013 | Victor ........................... | 715/821 |
| 2008/0209351 | A1 * | 8/2008 | Macadaan et al. ............ | 715/762 |
| 2009/0244003 | A1 * | 10/2009 | Bonnat ........................ | 345/157 |
| 2010/0205563 | A1 * | 8/2010 | Haapsaari et al. ............ | 715/825 |
| 2010/0211872 | A1 * | 8/2010 | Rolston et al. ................ | 715/702 |
| 2010/0214237 | A1 * | 8/2010 | Echeverri et al. ............. | 345/173 |
| 2010/0281374 | A1 * | 11/2010 | Schulz et al. ................. | 715/723 |
| 2011/0087970 | A1 * | 4/2011 | Swink et al. .................. | 715/752 |
| 2012/0047469 | A1 * | 2/2012 | Chelaru et al. ................ | 715/863 |
| 2012/0072848 | A1 * | 3/2012 | Yonemoto ..................... | 715/744 |

* cited by examiner

*Primary Examiner* — Steven Sax
*Assistant Examiner* — Christopher J Fibbi
(74) *Attorney, Agent, or Firm* — Fenwick & West LLP

(57) ABSTRACT

A user interface for a mobile device allows a user of a social networking service to conveniently view information of a related user and media items associated with the related user. The user interface enables the user to select a view of a related user by providing first user inputs. Each view has a defined section that displays media items associated with the selected user. The displayed media items in the defined section can be varied in response to receiving second user inputs. The user can select a media item in the defined section for further view or other actions.

16 Claims, 4 Drawing Sheets

USER INTERFACE FOR PRESENTING MEDIA ITEMS OF SOCIAL NETWORKING SERVICE IN MEDIA REEL

BACKGROUND

This invention relates to displaying media items of a social networking service on a computing device. More particularly, this invention relates to displaying media items in a defined area of a screen of a computing device.

Social networking services have become a popular venue for sharing media items. Users often upload various media items to a server for providing the social networking service to share the media items with other users of the social networking services. Such uploaded media items include, for example, messages, webpages or their components, images, and movie clips. The server for providing the social networking service selects media items relevant to the user based on, for example, user settings, relationships with other users and times when the media items were uploaded. The selected media items are then sent to certain users for display or to perform other interactions.

The media items stored in the server providing the social networking service may be accessed by various devices. In addition to desktop computers and laptop computers, handheld devices such as cell phones, smartphones and tablet computer are frequently used to access the social networking services. Although such handheld devices can perform most of the functions associated with the social networking service, these handheld devices tend to have smaller screens compared to desktop computers or laptop computers. Hence, the handheld devices can display a smaller number of media items simultaneously compared to the desktop computers and the laptop computers. Therefore, the user may have to navigate through multiple views or pages to locate the media items of interest.

Moreover, the handheld devices also have input devices different from the desktop computers or the laptop computers. Many handheld devices lack full keyboards or mouse devices. Hence, the process of inputting alphanumeric characters tends to require more time and mental focus of the users when using handheld devices. Further, more handheld devices are now equipped with input devices such as touchscreens that render swiping actions more convenient compared to the desktop computers or the laptop computers.

Conventional user interfaces displayed on the handheld devices for accessing or using the social networking services have been less than satisfactory. These user interfaces were unsuccessful in facilitating interactions with a large number of media items available from the social networking service. Also, these user interfaces did not adequately leverage characteristics of input devices in the handheld devices.

SUMMARY

Embodiments of the invention comprise a client device that includes a user interface for navigating through information about users of a social networking service as well as media items in the social networking service. In a first area of a screen of the client device, social information of a user of the social networking service is displayed. In a second area of the screen media items available from the social networking service is displayed. In response to receiving a user input, the media items can be moved across the screen to display another subset of the media items.

In one embodiment, another user input is received to cause social information of another user to be displayed in the first area of the screen. The social information of the user can be scrolled to move out of the screen and instead display the social information of the other user.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

Embodiments relate to a user interface that enables a user of a client device to conveniently view and navigate through information of users and media items in a social networking service. The user interface enables the user to scroll through the social information of other users of the social networking service by providing a user input in a first direction. Each view has a first area that displays social information associated with a user of a social networking service and a second area that displays media items in the social networking service. The displayed media items in the second section can be varied responsive to receiving a user input in a second direction. A media item in the second area can be selected for enlarged display or playback.

The social information described herein refers to any information associated with a specific user of a social networking service. The social information may include, for example, (i) an image of the user, (ii) a location of the user, (iii) contact information of the user, (iv) a message uploaded to the server by the user, and (v) a message associated with the user.

Example Architecture and Devices for Social Networking Service

Figure 1:
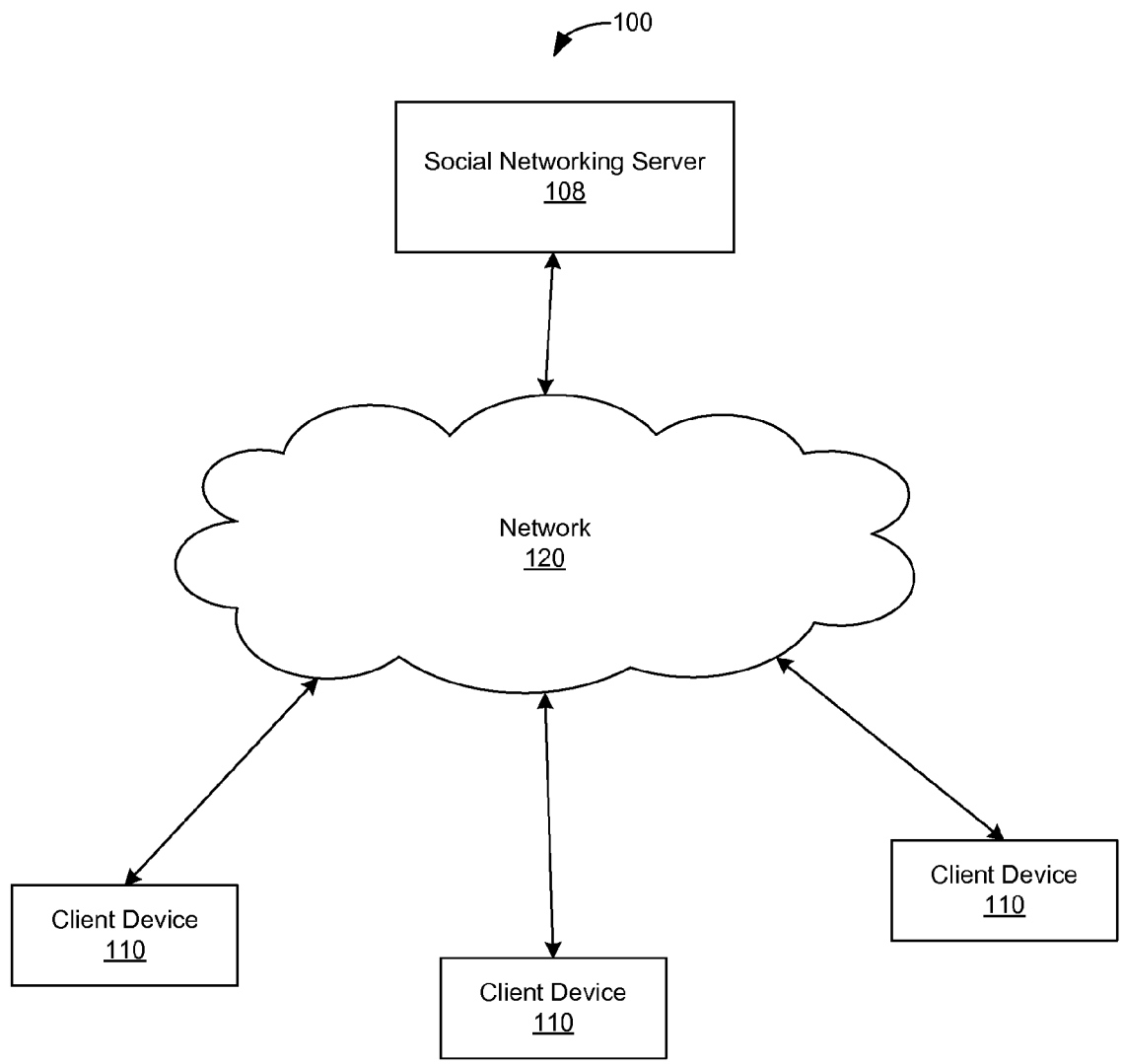
FIG. 1 is a block diagram of a system for providing social networking service, according to one embodiment of the present invention.

FIG. 1 block diagram of a system 100 for providing social networking service, according to one embodiment of the present invention. The system 100 includes a social networking server 108, a plurality of client devices 110 and a network 120. The social networking server 108 is a backend server for performing various operations to provide a social networking service, as described below in detail with reference to FIG. 2. Although the social networking server 108 is displayed as a single server, a plurality of servers may operate in conjunction to provide the social networking service to multiple users.

The client devices 110 are hardware devices that enable users to access the social networking service. The client devices 110 may be embodied as a handheld device such as a cell phone, a smartphone, a personal digital assistant (PDA), a portable game console and a tablet computer. The client devices 110 communicate with the social networking server 108 via the network 120. An example of the client devices 110 is described below in detail with reference to FIG. 3.

The network 120 is a combination of equipments for establishing communication channels between the social networking server 108 and the client devices 110. The network 120 may include, among other components, hardware devices such as routers and switches to transmit data between the social networking server 108 and the client devices 110. The network 120 may employ various types of physical media and protocols. In one embodiment, the network 120 is embodied as Internet.

Figure 2:
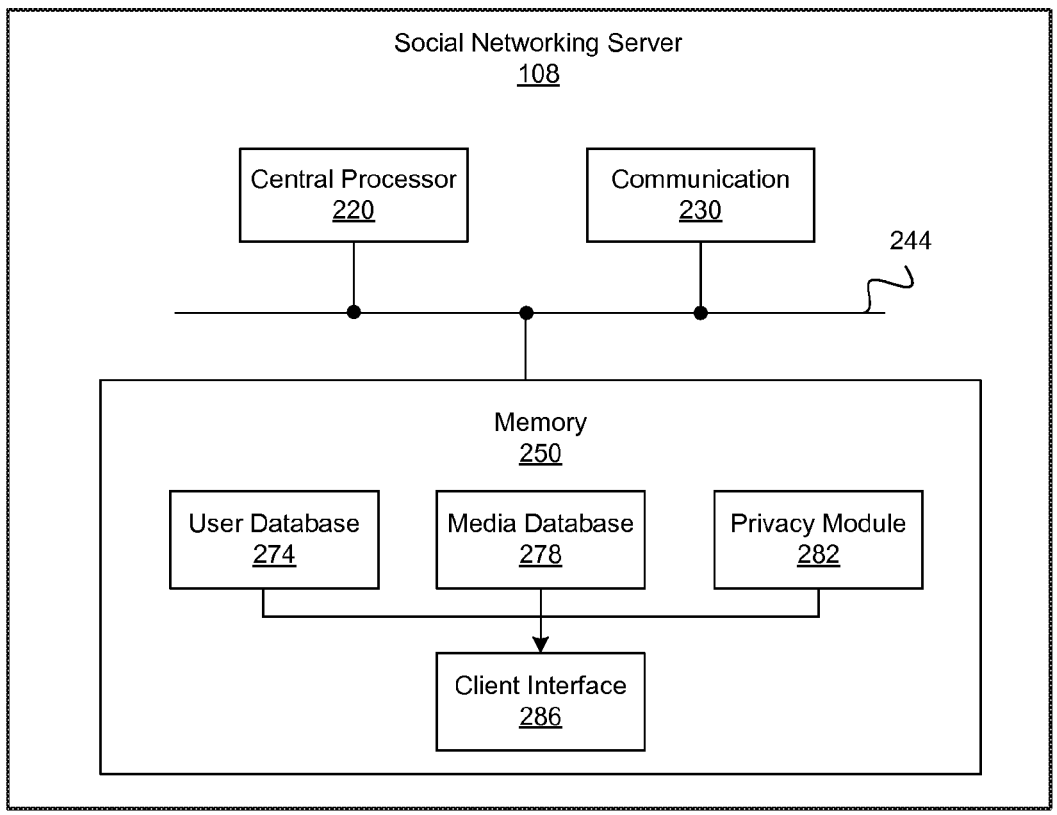
FIG. 2 is a block diagram illustrating a social networking server, according to one embodiment of the present invention.

FIG. 2 is a block diagram illustrating the social networking server 108, according to one embodiment of the present invention. The social networking server 108 performs operations to provide the social networking service to the client devices 110. The social networking server 108 receives media items from users, processes the media items as needed, and sends the media items to other users of the social networking service.

The social networking server 108 may include, among other components, a central processor 220, a communication module 230, memory 250 and a bus 244 connecting these components. The central processor 220 is a hardware component for executing instructions stored in the memory 250 and for controlling other components (e.g., the communication module 230) of the social networking server 108. Although only one central processor 220 is illustrated in FIG. 2, the social networking server 108 may include multiple central processors for increased processing capacity.

The communication module 230 is hardware, software, firmware or a combination thereof for communicating with the client devices 110 and other devices over the network 120. The communication module 230 may consist of multiple sub-modules for communicating over different protocols or channels.

The memory 250 is a computer-readable storage medium storing data including instructions for execution by the central processor 220. The memory 250 may store, among other instruction modules, a user database 274, a media database 278, a privacy module 282 and a client interface 286. The user database 274 stores user information such as authentication information, relationships between the users, log-in and log-out data, and user profiles. The user profiles may include, for example, names of the users (e.g., a combination of the first name and the last name), current locations of the users, contact information of the users (e.g., phone numbers or email addresses). At least part of a user's profile may be made available to other users having relationships with the user of the client device 110, as illustrated below in detail with reference to FIG. 4.

The media database 278 stores media items for sending to the client devices 110. The media items may be uploaded by the users of the social networking service, the social networking service provider or other entities affiliated with the social networking service. The media items in the media database 278 may include, among others, webpage components, images, movie clips, hyperlinks, executables and messages. In one embodiment, the media items are assembled into a webpage in the form of a newsfeed, as described, for example, in U.S. Pat. No. 7,669,123, entitled "Dynamically Providing a News Feed about a User of a Social Network," which is incorporated by reference herein in its entirety.

The privacy module 282 controls sharing of media items or other information associated with the users (e.g., the location of the users). A user may set a privacy policy in the privacy module 282 to define the range of users to share information, and the types and/or levels of details of information shared with other users.

The client interface 286 performs various operations for interacting with the client devices 110. The operations performed by the client interface 286 may include, (i) authentication of the users based on information available in the user database 274 and (ii) assembling of data for sending to the users based on information in the user database 274, the media database 278 and the privacy module 282. The user database 274 stores information associated with the users such as authentication information and the user profiles. The privacy module 282 stores the privacy policy set by the users of the social networking service. The client interface 286 selects media items or information based on the privacy module 282 and sends the media items or information to the client devices 110.

The components of the social networking server 108 in FIG. 2 are merely illustrative. The social networking server 108 may include other components such as input devices and output devices. Further, the memory 250 may store other instruction modules. For example, the memory 250 may store an advertisement module for selecting and including the advertisement in data sent to the client devices 110.

Figure 3:
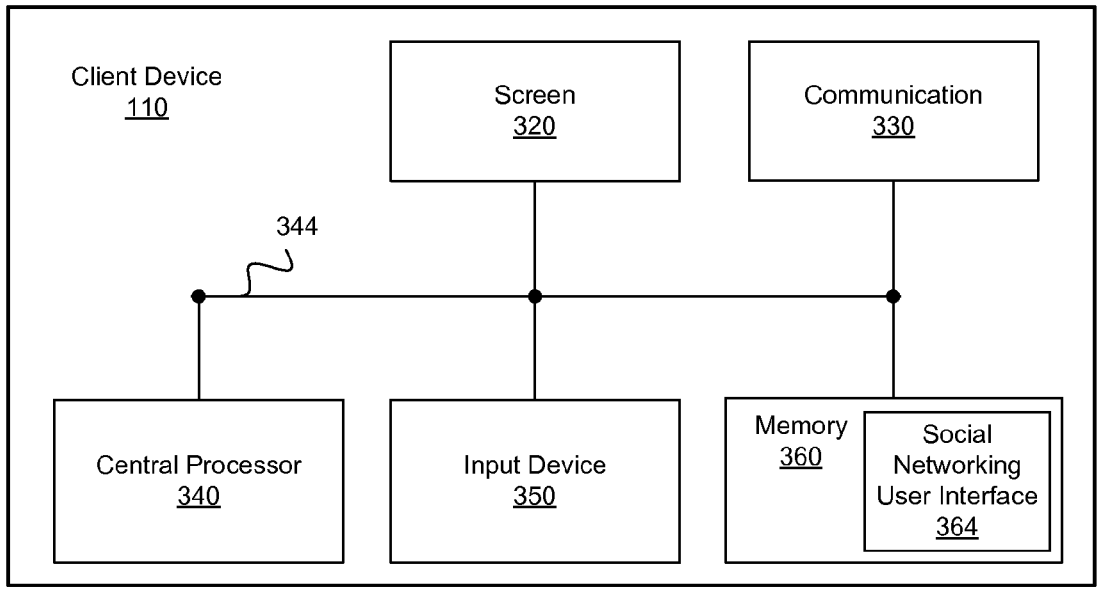
FIG. 3 is a block diagram illustrating a client device, according to one embodiment of the present invention.

FIG. 3 is a block diagram illustrating the client device 110, according to one embodiment of the present invention. The client device 110 interacts with the user to provide the social networking service. In one embodiment, the client device 110 includes a screen 320, a communication module 330, a central processor 340, an input module 350, memory 360 and a bus 344 connecting these components. The screen 320 may be embodied using various display technology including, but not limited to, a liquid crystal display (LCD) and light emitting diodes (LEDs). The screen 320 displays a graphical user interface for interacting with the social networking server 108.

The communication module 330 is hardware, software, firmware or a combination thereof for communicating with the social networking server 108 via the network 120. The communication module 330 may include a plurality of sub-modules for communicating via different protocols or channels. For example, the communication module 330 may include a sub-module for long-range communication and another sub-module for short-range communication.

The central processor 340 reads instructions stored in the memory 360 to interact with the social networking server 108. Although only one central processor is illustrated in FIG. 3, multiple central processors may be provided in the client devices 110 to perform certain dedicated functions. The central processor 340 also controls various hardware components in the client devices 110.

The input module 350 is hardware, software, firmware or a combination thereof for receiving user inputs associated with the operation of the client devices 110. The input module 350 may include, for example, touchscreens, keypads, keyboards, switches and microphones. Verbal commands received via the microphones may be processed for voice recognition. In one embodiment, the input module 350 is embodied at least partly as a multi-touch touchscreen.

The memory 360 is a computer-readable storage medium for storing data associated with the operation of the client device 110. The memory 360 stores, among other modules, a social networking user interface 364 for interfacing with the social networking server 108 and rendering a graphical user interface on the screen 320. The graphical user interface displayed on the screen 320 may include, among others, windows, icons, virtual keyboards, menus, and control elements such as buttons. In one embodiment, the social networking user interface 364 is part of an operating system.

In one embodiment, the social networking user interface 364 receives a page of information (e.g., webpage) from the social networking server 108 and displays the information in the format as defined by the social networking server 108. The social networking server 108 sends data defining the area of the screen 320 to display the user profiles and the media items as well as actions to be taken when certain user interface elements are selected. In another embodiment, the social networking user interface 364 sets or modifies the information received from the social networking server 108 into a format desired by the user. For example, the social networking user interface 364 receives raw user profiles and raw media items from the social networking server 108, and processes the received profiles and the media items into a format for display, as described below in detail with reference to FIG. 4.

Further, the social networking user interface 364 may display the user profiles and media items in two or more modes. One mode of presenting the user profiles and media items is described below in detail with reference to FIG. 4. In another mode, the user profiles and media items are displayed in a static webpage without any media reels. The user may choose between the display modes by providing user input via the input module 350.

Example User Interface Including Media Reel

The client devices 110 may include handheld devices such as cell phones, smartphones or tablet computers. Such handheld devices have limited screen sizes compared to desktop computers or laptop computers. Hence, the screen of the handheld devices may be too small to simultaneously display a large number of user interface elements associated with the social networking service. To view most or all of the user interface elements associated with the social networking service, the user may have to navigate through multiple pages of the social networking services. The user interfaces on the client devices 110 according to embodiments facilitate the users to view and access a large number of media items of the social networking service in a convenient and expedient manner.

Each client device 110 stores a sorted list of contacts, at least some of whom are users of the social networking server 108. The contacts in the client device 110 may be sorted based on criteria such as (i) alphabetical order, (ii) how close the contacts (or users) are related to the user of the client device 110 and (iii) how recent the contacts are updated. For each contact (or user), the client device 110 generates and displays a contact view page.

Figure 4:
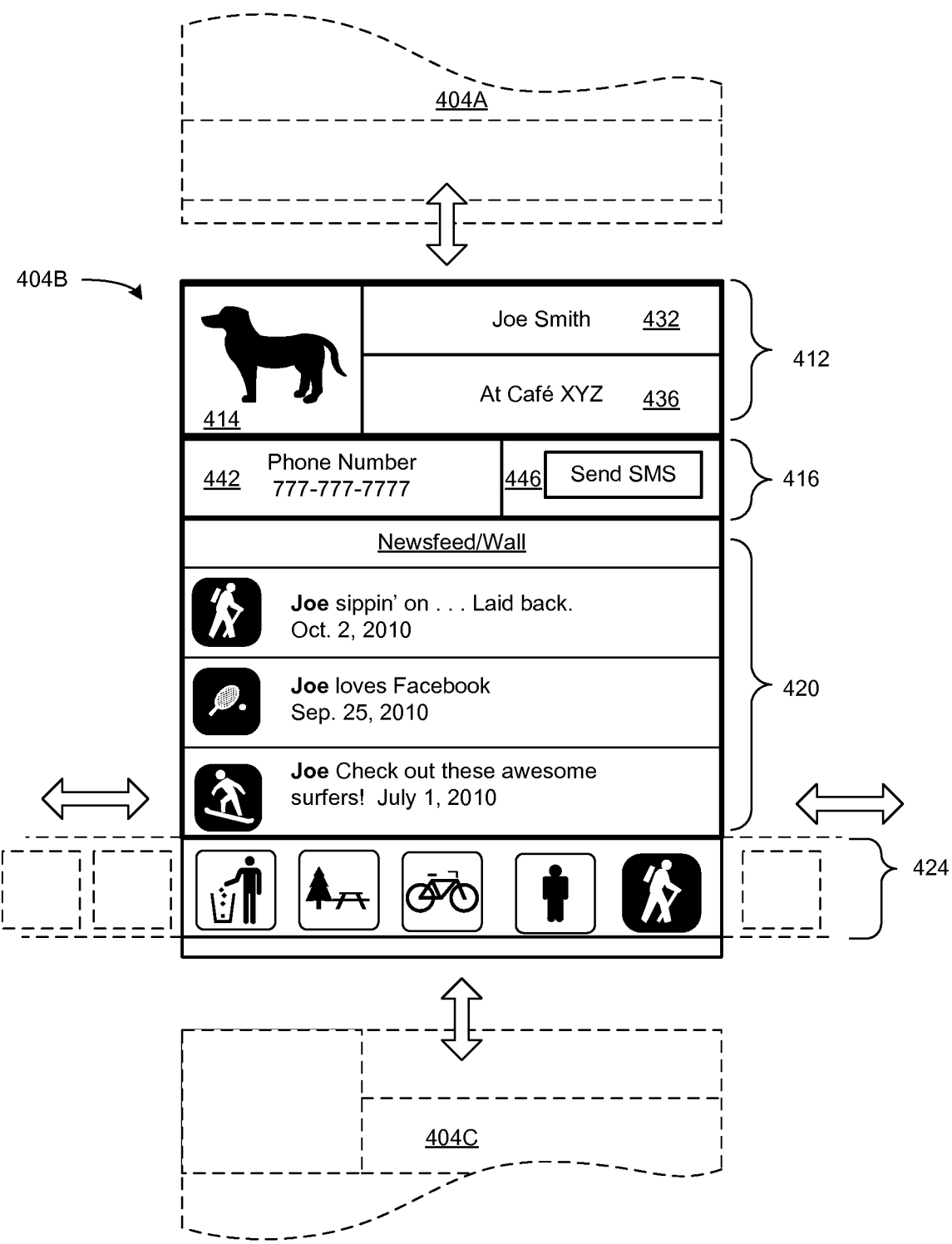
FIG. 4 is a graphical user interface image illustrating a contact view page displayed on a screen of the client device, according to one embodiment of the present invention.

FIG. 4 is a graphical user interface of a contact view page 404B displayed on the screen 320, according to one embodiment of the present invention. The contact view page 404B includes four different sections: (i) a user identification section 412 for identifying a user corresponding to the profile, (ii) a contact information section 416 for displaying contact information or initiating communication with the user corresponding to the user profile, (iii) a newsfeed or wall section 420 for displaying messages associated with the user of the user profile and (iv) a media reel 424 for displaying media items associated with the user. In other embodiments, the user interface may include additional sections, may include different sections, and/or may not include each of these sections.

In one embodiment, the user of the client device 110 may view the contact view page of different users by providing an input causing a vertical movement of the view. For example, the user may take vertical swiping motions on a touchscreen of the client device 100 to view the contact view page of another user. As illustrated in FIG. 4, the social networking user interface 364 may render images on the screen 320 to give the appearance that a contact view page 404A is placed above and a contact view page 404C is placed below the currently displayed contact view page 404B. As the user takes a vertical swiping motion on the touchscreen, the contact view page 404B makes a transitional movement upward or downward to display the contact view page 404C or the contact view page 404A. The user of the client device 110 may continue to provide inputs causing the vertical movements of views until a desired contact view page appears on the screen 320.

In another embodiment, a vertical swiping motion on an area of the touchscreen corresponding to the contact information section 416 causes contact information displayed in the contact information section 416 to scroll and show different contact information. The vertical swiping motion on an area of the touchscreen corresponding to the newsfeed or wall section 420 may cause messages to scroll vertically to show different messages. A vertical swiping motion in an area of the touchscreen corresponding to the user identification section 412 causes the user identification section 412, the contact information section 416 and the newsfeed or wall section 420 to scroll vertically to show sections for another user.

The user identification section 412 comprises an image 228 of the user, the identification area 432 and a location area 436. The identification area 432 indicates the identity of the user corresponding to the profile. The identification area 432 may indicate, for example, the last name and the first name of the user, the user's nickname or user ID. The location area 436 indicates the location of the user based on, for example, technology as described in U.S. patent application Ser. No. 12/574,614 entitled "Sharing of Location-Based Content Item in Social Networking Services," filed on Oct. 6, 2009, which is incorporated by reference herein in its entirety.

The contact information section 416 consists of a contact information area 442 and an action area 446. The contact information area 442 indicates the contact information of the user of the profile. The contact information displayed in the contact information area 442 may include, for example, phone numbers, email addresses, and instant messenger IDs of the user. The user of the client device 110 can launch an application for communicating with the user of the profile by choosing the action area 446 on the input device 350. In one embodiment, multiple contact information items and corresponding action areas may be presented in the contact information section 416. Each contact information item represents a different way of communicating with the user.

The newsfeed or wall section 420 displays media items uploaded by the user of the user profile in the form of a newsfeed, as described in U.S. Pat. No. 7,669,123, cited above. The displayed newsfeed may include one or more messages associated with the user of the profile. In one embodiment, the messages in the newsfeed or wall section 420 are messages uploaded by the user of the contact view page 404B (i.e., Joe Smith) to the social networking server 108. In another embodiment, the messages in the newsfeed or wall section 420 are messages uploaded by users other than the user of the contact view page 404B but related to the user of the contact view page 404B. Some messages may be accompanied by other media items (e.g., images or movie clips). The newsfeed section 420 may display a subset of newsfeed items or part of the messages in the newsfeed items. If a user of the client devices 110 selects the newsfeed section 420 (for example, by clicking on the newsfeed section 420), a new view may be launched on the screen 320 to display more newsfeed items and/or display the full messages in the newsfeed items.

The media reel 424 displays multiple media items available via the social networking server 108. In one embodiment, the media reel 422 displays multiple media items associated with the user of the profile in a smaller condensed form. If the original media item is a high-resolution image, for example, the media item in the media reel 424 is a low-resolution icon including a smaller number of pixels compared to the original media item. If the original media item in the media reel 424 is a movie clip, the media item in the media reel 424 may be a single still frame or a playback of the media item at a reduced resolution. In one embodiment, the original media items are extracted and processed into the condensed form by the social networking server 108 and then sent to the client devices 110 for display. Alternatively, the client devices 110 receive the original media items from the social networking server 108 and process the original media items into the condensed media items for display in the media reel 424.

In another embodiment, the media reel 424 displays multiple media items in or associated with messages in the newsfeed or wall section 420. In still another embodiment, the medial reel 424 displays any media items determined by the social networking service 108 as likely to be of interest to the user of the client device 110.

In one embodiment, the media reel 424 also scrolls vertically together with other sections of the contact view pages. Each contact view page includes a media reel that displays different sets of medial items. In another embodiment, the media reel 424 is overlaid on the contact view pages and does not scroll together with other sections of the contact view pages. The media items displayed in the media reel 424 may remain the same regardless of changes in the user identified in the user identification section 412.

The user of the client devices 110 may provide user inputs to view other media items in the media reel 424. In one embodiment, the user of the client device 110 makes horizontal swiping motions on the media reel 424 to view other media items. As the user makes a horizontal swiping motion, the set of media items currently displayed in the media reel 424 makes translational movement to the right or left. As one or more media items move out from the view at right or left end of the screen 320, a corresponding number of media items appear at the opposite end of the screen 320.

When the user of the client device 110 selects a media item in the media reel 424, a view may be launched to display or play the original media item. Alternatively, a view may be started to show a newsfeed corresponding to the selected media item. In one embodiment, the user of the client devices 110 may set the actions to be taken in response to selecting a media item in the media reel 424.

Method of Presenting User Interface with Media Reel

Figure 5:
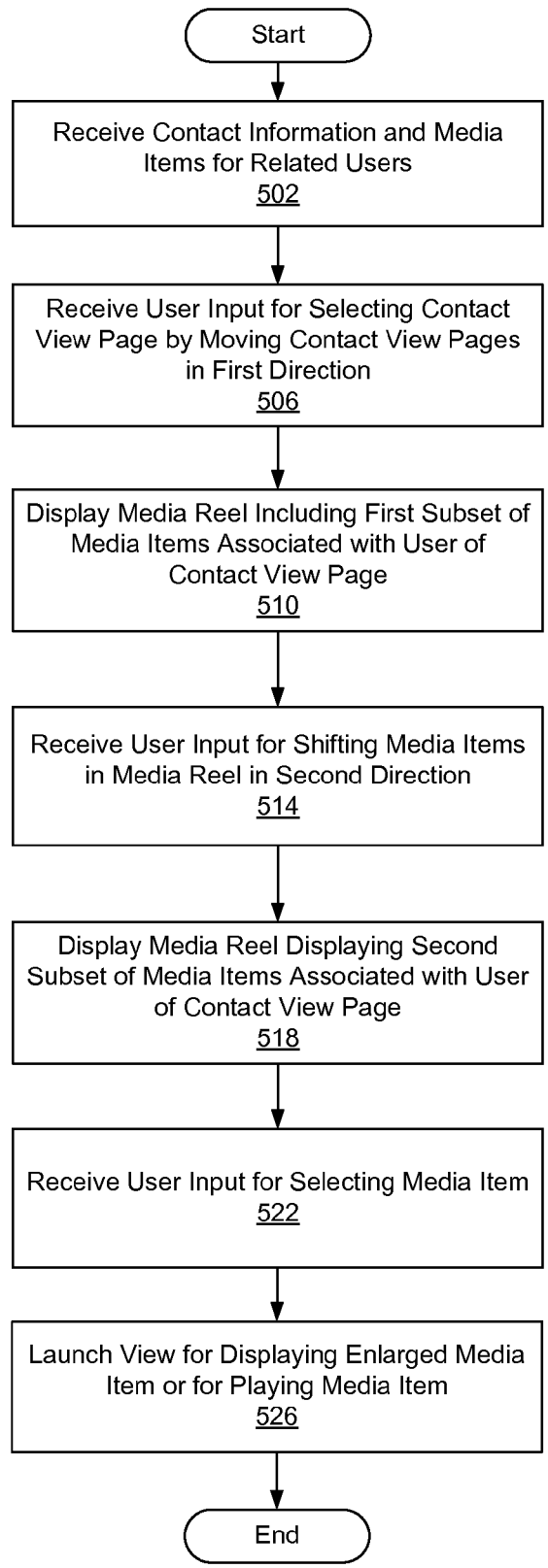
FIG. 5 is a flowchart illustrating the processes of displaying a contact view page with a media reel, according to one embodiment of the present invention.

FIG. 5 is a flowchart illustrating the processes for displaying contact view pages with media reel media reels 424, according to one embodiment of the present invention. The communication module 330 of the client device 110 receives 502 the user profiles and the media items of the users having relationships with the user of the client devices 110 in the social networking service.

The input device 350 of the client device 110 receives 506 user inputs for selecting a contact view page. The social networking user interface 364 of the client device 110 moves the contact view pages in a first direction (e.g., a vertical direction) according to the user input, as described above in detail with reference to FIG. 4.

Within each contact view page, the social networking user interface 364 of the client device 110 displays 510 a media reel 424. The media reel 424 includes a first subset of media items associated with the user of the profile. If the media reel 424 does not display the media items that the user of the client devices 110 desires, the user of the client devices 110 may provide user inputs via the input device 350 to display other media items in the media reel 424.

After receiving 514 the user inputs, the social networking user interface 364 of the client device 110 shifts the media items in a second direction (e.g., a horizontal direction). In one embodiment, the second direction (e.g., a vertical direction) is perpendicular to the first direction. In response to receiving the user input for shifting the media items, the social networking user interface 364 of the client devices 110 displays 518 a second subset of media items in the media reel 424.

The user of the client devices 110 may continue to cause translational movements of the media items until a desired media item or a media item of interest is displayed in the media reel 424 by providing user inputs via the input device 350. The user of the client devices 110 may then select 522 a media item by providing the user input for selecting the media item. Then the client device 110 launches 526 a view for displaying an enlarged version of the media item or for playing back the media item.

It is to be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable non-transitory computer-readable storage medium. Suitable computer-readable storage medium may include, among others, volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method comprising:
    displaying social information associated with a contact of a user of a social networking service in a first area of a mobile client device, wherein the social information comprises at least one of: an image of the contact, a location of the contact, contact information of the contact, a message uploaded to the server by the contact, and a message associated with the contact;
    displaying a plurality of user interface elements in a condensed form representing media items associated with the social information displayed in the first area and determined by the social networking service to be of interest to the user in a second area of the mobile client device overlaid on the first area at a first position, the displayed social information independent of the plurality of user interface elements displayed in the second area, wherein the second area comprises a media reel displaying the plurality of user interface elements, the media reel operable to make translational movements;

responsive to receiving, on a touchscreen, a first user input corresponding to a horizontal swiping motion, moving the plurality of user interface elements within the second area in a horizontal direction independent of the social information in the first area, wherein at least one user interface element is removed from view on the media reel at one end and replaced with at least another user interface element from an opposite end of the media reel;

receiving selection of a user interface element in the second area;

displaying a media item corresponding to the selected user interface element responsive to receiving the selection;

responsive to receiving, on the touchscreen, a second user input corresponding to a vertical swiping motion, moving the social information within the first area in a vertical direction independent of the user interface elements in the second area, wherein the overlaid media reel maintains the first position;

responsive to the vertical swiping motion, displaying the social information associated with another contact of the user of the social networking service in the first area of the mobile client device; and responsive to the vertical swiping motion, displaying updated user interface elements in a condensed form in the media reel representing media items associated with the social information associated with said another contact of the user in the first area and determined by the social networking service to be of interest to the user.

2. The method of claim 1, further comprising receiving the plurality of user interface elements representing media items and the social information from a server providing the social networking service.

3. The method of claim 1, wherein the message uploaded to the server or the message associated with the contact comprises a newsfeed.

4. The method of claim 3, wherein at least one of the plurality of the media items is associated with the newsfeed.

5. The method of claim 1, wherein the horizontal direction and the vertical direction are perpendicular.

6. The method of claim 1, further comprising determining said another contact whose social information is to be displayed based on a sorted list.

7. The method of claim 1, wherein the media items comprise images and movie clips.

8. The method of claim 1, wherein at least one of the plurality of media items is associated with the user.

9. The method of claim 1, wherein at least one of the plurality of the media items comprises media items not associated with the user.

10. A mobile computing device, comprising:
a touchscreen input device configured to receive a first user input in a horizontal direction, a user input selecting a media item in a second area, and a second user input in a vertical direction; and a social networking user interface configured to:
display social information associated with a contact of a user of a social networking service in a first area of a mobile client device, wherein the social information comprises at least one of: an image of the contact, a location of the contact, contact information of the contact, a message uploaded to the server by the contact, and a message associated with the contact;

display a plurality of user interface elements in a condensed form representing media items associated with the social information displayed in the first area and determined by the social networking service to be of interest to the user in the second area of the mobile client device overlaid on the first area at a first position, the displayed social information independent of the plurality of user interface elements displayed in the second area, wherein the second area comprises a media reel displaying the plurality of user interface elements, the media reel operable to make translational movements;

responsive to receiving, on the touchscreen, the first user input corresponding to a horizontal swiping motion, moving the plurality of user interface elements within the second area in the horizontal direction independent of the social information in the first area, wherein at least one user interface element is removed from view on the media reel at one end and replaced with at least another user interface element from an opposite end of the media reel;

receive selection of a user interface element in the second area;

display a media item corresponding to the selected user interface element responsive to receiving the selection;

responsive to receiving, on the touchscreen, the second user input corresponding to a vertical swiping motion, moving the social information within the first area in the vertical direction independent of the user interface elements in the second area, wherein the overlaid media reel maintains the first position;

responsive to the vertical swiping motion, displaying the social information associated with another contact of the user of the social networking service in the first area of the mobile client device; and responsive to the vertical swiping motion, displaying updated user interface elements in a condensed form in the media reel representing media items associated with the social information associated with said another contact of the user in the first area and determined by the social networking service to be of interest to the user.

11. The mobile computing device of claim 10, further comprising a communication module configured to receive the plurality of user interface elements representing media items and the social information from a server providing the social networking service.

12. The mobile computing device of claim 10, wherein the message uploaded to the server or the message associated with the contact comprises a newsfeed.

13. The mobile computing device of claim 10, wherein the horizontal direction and the vertical direction are perpendicular.

14. The mobile computing device of claim 10, wherein the social networking user interface is further configured to determine said another contact whose social information is to be displayed based on a sorted list.

15. The mobile computing device of claim 10, wherein the media items comprise images and movie clips.

16. A non-transitory computer-readable storage medium storing instructions, the instructions when executed by a processor in a client device for accessing a social networking service, cause the processor to:

display social information associated with a contact of a user of a social networking service in a first area of a mobile client device, wherein the social information comprises at least one of: an image of the contact, a location of the contact, contact information of the contact, a message uploaded to the server by the contact, and a message associated with the contact;

display a plurality of user interface elements in a condensed form representing media items associated with the social information displayed in the first area and determined by the social networking service to be of interest to the user in a second area of the mobile client device overlaid on the first area at a first position, the displayed social information independent of the plurality of user interface elements displayed in the second area, wherein the second area comprises a media reel displaying the plurality of user interface elements, the media reel operable to make translational movements;

responsive to receiving, on a touchscreen, a first user input corresponding to a horizontal swiping motion, moving the plurality of user interface elements within the second area in a horizontal direction independent of the social information in the first area, wherein at least one user interface element is removed from view on the media reel at one end and replaced with at least another user interface element from an opposite end of the media reel;

receive selection of a user interface element in the second area;

display a media item corresponding to the selected user interface element responsive to receiving the selection;

responsive to receiving, on the touchscreen, a second user input corresponding to a vertical swiping motion, moving the social information within the first area in a vertical direction independent of the user interface elements in the second area, wherein the overlaid media reel maintains the first position;

responsive to the vertical swiping motion, displaying the social information associated with another contact of the user of the social networking service in the first area of the mobile client device; and responsive to the vertical swiping motion, displaying updated user interface elements in a condensed form in the media reel representing media items associated with the social information associated with said another contact of the user in the first area and determined by the social networking service to be of interest to the user.

* * * * *